United States Patent
Bihr et al.

(10) Patent No.: US 11,789,344 B2
(45) Date of Patent: Oct. 17, 2023

(54) HOUSEHOLD APPLIANCE WITH A CAMERA AND A REINFORCEMENT PART CONNECTED THERETO, AND METHOD FOR MOUNTING THE CAMERA

(71) Applicant: BSH HAUSGERAETE GMBH, Munich (DE)

(72) Inventors: Daniel Bihr, Kirchheim am Ries (DE); Stephan Kempfle, Ellzee (DE); Christopher Rodney, Burgau (DE); Joachim Schaeferling, Bissingen (DE)

(73) Assignee: BSH Hausgeraete GmbH, Munich (DE)

( * ) Notice: Subject to any disclaimer, the term of this patent is extended or adjusted under 35 U.S.C. 154(b) by 227 days.

(21) Appl. No.: 17/401,759

(22) Filed: Aug. 13, 2021

(65) Prior Publication Data
US 2022/0050362 A1 Feb. 17, 2022

(30) Foreign Application Priority Data

Aug. 13, 2020 (DE) ...................... 10 2020 210 278.3

(51) Int. Cl.
| | |
|---|---|
| *G03B 17/56* | (2021.01) |
| *H01R 13/627* | (2006.01) |
| *F25D 29/00* | (2006.01) |
| *H01R 13/631* | (2006.01) |
| *H01R 13/74* | (2006.01) |

(52) U.S. Cl.
CPC ........... *G03B 17/561* (2013.01); *F25D 29/00* (2013.01); *H01R 13/6271* (2013.01); *H01R 13/631* (2013.01); *H01R 13/748* (2013.01)

(58) Field of Classification Search
None
See application file for complete search history.

(56) References Cited

U.S. PATENT DOCUMENTS

| | | |
|---|---|---|
| 5,244,411 A | 9/1993 | Schinke et al. |
| 10,181,678 B2 | 1/2019 | Pemwieser |
| (Continued) | | |

FOREIGN PATENT DOCUMENTS

| | | |
|---|---|---|
| CN | 1981170 A | 6/2007 |
| CN | 205647718 U | * 10/2016 |
| (Continued) | | |

*Primary Examiner* — Rodney E Fuller
(74) *Attorney, Agent, or Firm* — Laurence A. Greenberg; Werner H. Stemer; Ralph E. Locher (57) ABSTRACT

A household appliance includes a camera with a housing and a first electrical plug connector in the housing. A reinforcement part separate from the camera is configured for direct connection to the housing through a cutout in a wall of the appliance such that the housing and the reinforcement part are disposed on opposite sides of the wall. The reinforcement part has a second electrical plug connector for connection to the first electrical plug connector. The second plug connector is a separate component provided on the reinforcement part by a snap-fit connection and/or in the mounted state the first electrical plug connector is snap-fitted to the second electrical plug connector by a snap-fit connection and/or the housing of the camera is connected in the mounted final state to the reinforcement part by a screw connection. A mounting method for the camera is also provided.

15 Claims, 9 Drawing Sheets

(56) References Cited

U.S. PATENT DOCUMENTS

| | | | |
|---|---|---|---|
| 11,009,287 B2 | 5/2021 | Kim et al. | |
| 2016/0057394 A1* | 2/2016 | Marutani | F25D 23/12 348/143 |
| 2016/0182868 A1* | 6/2016 | Izawa | H04N 23/57 348/36 |
| 2016/0201974 A1 | 7/2016 | Grimminger et al. | |
| 2017/0234602 A1* | 8/2017 | Seo | F25D 23/12 348/151 |

FOREIGN PATENT DOCUMENTS

| | | |
|---|---|---|
| CN | 205664602 U | 10/2016 |
| CN | 107634485 A | 1/2018 |
| CN | 109196292 A | 1/2019 |
| CN | 109863649 A | 6/2019 |
| DE | 102005005705 A1 | 8/2006 |
| DE | 102013216759 A1 | 2/2015 |
| DE | 102013216767 A1 | 2/2015 |
| DE | 102021200493 A1 * | 7/2022 |
| WO | WO-2022157046 A1 * | 7/2022 |

* cited by examiner

HOUSEHOLD APPLIANCE WITH A CAMERA AND A REINFORCEMENT PART CONNECTED THERETO, AND METHOD FOR MOUNTING THE CAMERA

CROSS-REFERENCE TO RELATED APPLICATION

This application claims the priority, under 35 U.S.C. § 119, of German Patent Application DE 10 2020 210 278.3, filed Aug. 13, 2020; the prior application is herewith incorporated by reference in its entirety.

BACKGROUND OF THE INVENTION

Field of the Invention

One aspect of the invention relates to a household appliance with a camera having a housing and a first electrical plug connector disposed in the housing. The household appliance also has a reinforcement part which is separate from the camera and is provided for direct connection to the housing through a cutout in the wall, in such a way that the housing and the reinforcement part are disposed on opposite sides of the wall. The reinforcement part has a second electrical plug connector provided for connection to the first electrical plug connector. A further aspect of the invention relates to a method for mounting a camera on a wall of a household appliance.

In modern household appliances, such as for example a household refrigeration appliance, it is known for at least one camera to be present with which a receiving chamber for foodstuffs can be recorded. In household refrigeration appliances, it is known for such a camera to be disposed on a wall of an inner container which delimits the receiving chamber. Because specifically in household refrigeration appliances a thermal insulation is required between the inner container and the outer housing of the household refrigeration appliance, such a fastening is more difficult. In order to enable the fastening, a reinforcement part is used in addition to a camera. The reinforcement part is usually disposed in an intermediate space between the inner container and the outer housing. The reinforcement part is thus disposed in particular on the foam side. That means that it is disposed in an intermediate space containing thermal insulation foam between the inner container and the outer housing. A structure of that type is known for example from German Patent Application DE 10 2013 216 767 A1. A reinforcement part of that type is snap-fitted in a cutout of a wall of the inner container. Furthermore, a support for a camera housing and an illumination unit is inserted into the reinforcement part and simultaneously snap-fitted therein. Connection interfaces which are present for the electrical connection of the camera are integrated in a rear wall of the reinforcement part or guided into the interior of the reinforcement part by using a cable.

In that structure, the mounting and positioning of the camera is relatively complex. The connection interfaces must be connected to one another with a correspondingly high degree of mounting effort. To that end, they must be additionally joined together and cabled only after the camera has been mounted.

BRIEF SUMMARY OF THE INVENTION

It is accordingly an object of the invention to provide a household appliance with a camera and a reinforcement part connected thereto as well as a method for improved mounting of the camera, which overcome the hereinafore-mentioned disadvantages of the heretofore-known appliances and methods of this general type.

With the foregoing and other objects in view there is provided, in accordance with the invention, a household appliance. The household appliance has a camera. The camera has a housing and a first electrical plug connector. This first electrical plug connector is disposed in the housing of the camera. Furthermore, the household appliance has a reinforcement part which is separate from the camera. This reinforcement part is configured for direct connection to the housing of the camera. In particular, this connection is provided through a cutout in a wall of the household appliance in such a way that the housing and the reinforcement part are disposed on opposite sides of the wall. The reinforcement part has a second electrical plug connector. This second electrical plug connector is configured for connection to the first electrical plug connector. The second electrical plug connector is a separate component. This second plug connector is disposed on or fastened to the reinforcement part by way of a snap-fit connection. In addition or instead, provision can be made in the household appliance for the first electrical plug connector to be connected to the second electrical plug connector directly by way of a snap-fit connection and thus snap-fitted thereto in the mounted state. In addition or instead, provision can be made in the household appliance for the housing of the camera to be connected to the reinforcement part by way of a screw connection in the mounted final state.

This proposed configuration of the camera and the reinforcement part advantageously creates a particularly modular concept. The plug connectors are connected to one another individually, namely by way of a snap-fit connection. As a result, a simple mounting concept can be achieved. The two plug connectors are then also held together in a mechanically stable and precisely positioned manner. A snap-fit connection of this type, in which the two electrical plug connectors are directly snap-fitted to one another, can be produced quickly, easily and expediently, and on the other hand can also be released again easily. The snap-fit connection between the first electrical plug connector and the reinforcement part is to be assessed in a corresponding manner. Furthermore, a concept of this type makes it possible for the plug connectors on the reinforcement part on one hand and on the camera on the other hand to be prefabricated in such a way that they are already installed in a fixed manner in their position on the respective components before the camera is connected to the reinforcement part. As a result, when the camera and the reinforcement part are joined together mechanically, the mechanical and thus also the electrical connection between the two plug connectors is then achieved automatically in a particularly simple manner. A mounting effort, in particular a positioning and cabling effort for the individual plug connectors, in particular after the mounting of the camera on the reinforcement part, is thus significantly reduced.

The proposed concept thus also makes it possible for the camera to be joined effectively blindly to the reinforcement part and in this regard for the two electrical plug connectors to be plugged together automatically, also effectively without sight, during this joining process.

As a result, no separate, additional work step is required in order to join the two plug connectors together. In the system known from the prior art, the ends of the connection interfaces must be manually joined together and thus plugged together once again separately after the camera has been joined to the reinforcement part.

In the alternative concept in which the housing of the camera is connected in the mounted final state to the reinforcement part, in particular directly, by way of at least one screw connection and in which no direct snap-fitting is therefore provided between the plug connectors, an additional, in particular single screw connection is provided. In particular, only a single screw connection of this type is provided. A stable mechanical fastening of the camera to the reinforcement part is thus also enabled. In particular, in this embodiment the second plug connector is connected mechanically to the reinforcement part directly by way of a snap-fit connection. Another fastening of the second electrical plug connector directly to the reinforcement part can however also be provided in this case. This results in a further independent aspect of the invention for a configuration. Then only the screw connection is provided, in particular at the specific position as also explained further in the following, in order to connect the camera directly to the reinforcement part.

In one exemplary embodiment, the reinforcement part has a contact plate. The contact plate is provided for direct contact on the wall of the household appliance during the intended use when the reinforcement part is mounted on the wall. Furthermore, the reinforcement part has a coupling unit which protrudes from the contact plate. This coupling unit has a receiving slot. This second plug connector is disposed in the receiving slot. In the advantageous exemplary embodiment cited above, this second plug connector is disposed by way of the snap-fit connection in this receiving slot and snap-fitted therein. A compact and protected space is thus also formed for this second plug connector on the reinforcement part. The coupling unit makes it particularly easy for this reinforcement part to also be guided through the cutout in the wall. This coupling unit thus extends on both sides of the cutout in the wall. The contact plate enables a stable positioning of the reinforcement part on the wall. The coupling unit, on the other hand, facilitates a particularly simple and nevertheless mechanically stable direct connection to the camera. In this regard, the camera extends in the mounted state on the opposite side of the wall, in particular with regard to the position of the contact plate of the reinforcement part.

This concept also enables a particularly advantageous positioning of the configuration on this wall. In this context, the contact plate also forms a large-surface supporting wall, which rests in direct contact with the wall of the household appliance. An undesirable tilting is thereby prevented. Furthermore, lever forces generated by the camera which may be spaced relatively far apart on the other side of the wall, can be absorbed in an improved manner. As a result, undesirable deformation forces on the wall of the household appliance are thereby also prevented.

In one exemplary embodiment, a snap-fit element of the snap-fit connection is integrated on a housing of the second plug connector and is thus configured to be integral therewith. A counter snap-fit element of the snap-fit connection is provided on an inner side of a slot wall of the receiving slot of the coupling unit. An embodiment of this type reduces a mounting effort for a snap-fit element, since it is configured to be integral with the housing. As a result, the snap-fit element is also disposed permanently in a precise position on the housing of the second plug connector. A targeted and easy engagement with the counter snap-fit element is thereby enabled. Furthermore, a relatively tolerance-free snap-fit connection is enabled by these permanent, precise positions of the snap-fit element and the counter snap-fit element. This enables a very precisely positioned connection and a relatively play-free connection even in the mounted state.

In one exemplary embodiment, the reinforcement part has a guide ramp. The housing of the second plug connector has a snap-fit element for snap-fitting with the first plug connector. The guide ramp presses the snap-fit element out of a snap-fit position so as to prevent a snap-fitting of the snap-fit element of the second plug connector to the first plug connector in the mounted state. An embodiment of this type thus also enables the housing of the second plug connector to be used as an identical component for different variants of the configuration. This is advantageous in that for example only one injection molding tool is thus required for the housing constructed from plastic of the second plug connector. If in this context a variant of the configuration is required in which the two plug connectors are not to be connected directly by way of a snap-fit connection, this identical part in the form of the housing of the second plug connector can nevertheless be used in this configuration. In this regard, the reinforcement part with this guide ramp can be constructed in such a way that during mounting this snap-fit element is automatically brought into a position in which it cannot snap-fit to the counter snap-fit element of the first plug connector.

In one exemplary embodiment, the housing of the camera has a widened end piece. In one exemplary embodiment, the reinforcement part has a widened front piece. In this exemplary embodiment, provision is made in particular for this widened end piece of the housing of the camera to be fitted onto the widened front piece of the reinforcement part. In particular, the end piece of the housing of the camera is pushed over the front piece of the reinforcement part. It is thus disposed in the interior of the housing of the camera. In particular, in this exemplary embodiment the screw connection is provided in the pieces which are guided into each other and in this regard widened. As a result, a correspondingly larger boss can be provided so that the screw connection can also be produced in a very stable manner. Furthermore, provision is made for these widened pieces to be disposed in such a way that they effectively serve as a support base with regard to the weight force, in particular also lever forces of the camera. In particular, these widened pieces are thus provided on the lower region of the housing of the camera and on the lower region of the reinforcement part when viewed in the height direction.

In one exemplary embodiment, this screw connection is provided behind a rear end of the second plug connector when viewed in the direction of the longitudinal axis of the configuration. On one hand, this does not impair the space requirement and the installation space for the second plug connector. On the other hand, there is a greater space requirement in this position along the longitudinal axis in order in this regard to be able to provide a larger screw boss for the screw connection in the reinforcement part.

In one exemplary embodiment, the housing of the second plug connector has a snap-fit element for snap-fitting to a counter snap-fit element. The counter snap-fit element is provided on the first plug connector. By way of this snap-fit element and this counter snap-fit element, it is possible to produce a snap-fit connection with which in the mounted state the first electrical plug connector is snap-fitted directly to the second electrical plug connector. This location-specific configuration of the snap-fit element on the housing of the second plug connector in turn enables an integral embodiment to be realized. Furthermore, this snap-fit element is thus relatively exposed, which enables a targeted and smooth snap-fitting to the counter snap-fit element. It is thus necessary to bypass other components in a complex manner, so that an anchoring or clamping of the snap-fit element to such components to be bypassed is avoidable in this embodiment.

In one exemplary embodiment, with this direct connection of the first plug connector to the second plug connector by way of a snap-fit connection, it is also provided that no additional screw connection is used to retain the housing of the camera on the reinforcement part. In particular, in this exemplary embodiment a mechanical retaining connection is realized between the camera and the reinforcement part exclusively by way of this snap-fit connection. This is a particularly simple and mounting-friendly concept. No additional fastening elements such as screws or the like are thus required. In particular, the number of components is thereby reduced.

In one exemplary embodiment, the housing of the camera has a release opening. It is possible to engage through this release opening from outside the housing using a tool in order to release the snap-fit connection between the plug connectors. This too, enables a simple mounting concept for disassembly.

In one exemplary embodiment, the housing of the camera has a widened end piece, into which a widened front piece of the reinforcement part can be inserted or is inserted in the mounted state. In one exemplary embodiment, guides are formed by the widened end pieces, by way of which the two plug connectors are automatically plugged together when the housing of the camera is fitted onto the reinforcement part. This is a further advantageous embodiment, since the mounting effort can thus also be reduced in this regard. No complex adjustment process is required when mounting the housing of the camera onto the reinforcement part. It is merely necessary to guide the camera and the reinforcement part toward one another in a mating direction, wherein the components are automatically centered relative to one another by way of these two widened end pieces. This then automatically enables a correct position of the plug connectors relative to one another in such a way that they are also coupled to one another and plugged together automatically by being guided toward one another in a linear manner. In this embodiment, the blind joining already mentioned above is then also to be specified in a particularly advantageous manner. The mounting effort is particularly simple in this regard. By being guided toward one another, the plug connectors are thus expediently also plugged together automatically.

In one exemplary embodiment, the configuration has the wall of the household appliance. In the mounted state, the reinforcement part is disposed on one side of the wall and extends with a coupling unit of the reinforcement part through a cutout in the wall. This reinforcement part is embodied for coupling to the camera. The camera is disposed on the opposite side of this wall of the household appliance. In the mounted state, a rear edge of the housing of the camera is positioned resting against the wall. This, too, then supports the secure and permanent positioning of the camera. In particular, an improved absorption of the lever forces of the camera, which may protrude relatively far from the wall, is then also enabled.

In one exemplary embodiment, the housing of the camera is an elongated housing channel. It thus protrudes relatively far and in a self-supporting manner from the wall of the household appliance. On its end facing away from the reinforcement part, this elongated housing channel has an arc segment. The recording region of the camera, in particular the orientation of the camera lens, is thus configured to be inclined toward the longitudinal axis of the elongated housing channel. This geometrical embodiment and positioning enables the camera to be oriented in a space-saving manner and nevertheless aligned with its recording region so as to facilitate an optimum, comprehensive recording of the receiving chamber of the household appliance, in particular of the household refrigeration appliance.

With the objects of the invention in view, there is also provided a household refrigeration appliance as an example of a household appliance. The household refrigeration appliance can be a refrigerator or a freezer or a combined refrigerator-freezer. The household refrigeration appliance is configured for storing and conserving foodstuffs. It can have a refrigerator compartment or a freezer compartment as the receiving chamber. Both receiving chambers are also possible in one exemplary embodiment. A receiving chamber is delimited by walls of an inner container of the household refrigeration appliance. An inner container of this type is usually constructed from plastic. It is part of a housing of the household refrigeration appliance. The housing of the refrigeration appliance also has an outer housing, which is separate from the inner container. The inner container is received in the outer housing. An intermediate space between the outer housing and the inner container contains a thermal insulation material. This can be in particular thermal insulation foam. Likewise, a door of the household refrigeration appliance can have a wall which is an inner wall. The door can also have an outer wall. An intermediate space between the inner wall and the outer wall contains thermal insulation material.

In the mounted state, provision is made for the reinforcement part to be disposed at least in regions in an intermediate space cited above. It is positioned at least with a contact plate in this intermediate space. The contact plate rests in particular against a rear side of the wall or inner wall facing away from the intermediate space. In the mounted state of the household refrigeration appliance, the thermal insulation material rests directly on this reinforcement part. The camera can be disposed on a wall of the household refrigeration appliance. In particular on an inner wall. This can delimit the receiving chamber in a closed state of a door of the household refrigeration appliance. The inner wall can be an inner wall of the door. It can however also be a wall of the inner container.

This configuration with the camera and the reinforcement part can thus be disposed on a wall of an inner container of the household refrigeration appliance. The wall of the household refrigeration appliance can however also be part of a door of the household refrigeration appliance, for example. This can be the inner paneling of the door, for example. In the closed state of the door, the inner paneling faces toward the receiving chamber of the household refrigeration appliance. This inner paneling, too, is a visible component or an outer component of the door. An intermediate space between an outer paneling and an inner paneling of the door can also be delimited thereby. This intermediate space can also contain thermal insulation material.

With the objects of the invention in view, there is concomitantly provided a method for mounting a camera on a wall of a household appliance, in particular according to the aforementioned aspect or an advantageous embodiment thereof. The following steps are carried out in the method:

providing a wall of the household refrigeration appliance, providing a camera with a housing and a first electrical plug connector, which is disposed in the housing, providing a reinforcement part separate from the camera, which is embodied for direct connection to the housing through a cutout in the wall, positioning the housing of the camera and the reinforcement part on opposite sides of the wall, providing the reinforcement part with a second electrical plug connector, which is constructed for connection to the first electrical plug connector, and the second plug connector is a separate component and is disposed in a snap-fit manner on the reinforcement part by way of a snap-fit connection, and/or the first electrical plug connector is snap-fitted to the second electrical plug connector by way of a snap-fit connection, and/or the housing of the camera is connected in the mounted final state to the reinforcement part by way of a screw connection.

In the mounting process, too, it is in particular possible for the camera to be connected by using a blind joining in the reinforcement part. In particular, a connection of the two plug connectors is achieved automatically in this blind joining. The two plug connectors are thus plugged together blindly when the camera is guided together with the reinforcement part. With regard to the mounting steps, if only the second plug connector is connected to the reinforcement part by way of a snap-fit connection and the two plug connectors are not directly connected to one another by way of a further snap-fit connection, the camera, in particular the housing of the camera, can be connected to the reinforcement part by way of an in particular single screw connection. In a further exemplary embodiment, the camera with its housing is mounted on the reinforcement part once the second plug connector has been connected to the reinforcement part by way of a snap-fit connection. In this exemplary embodiment, the first plug connector is then connected mechanically by way of a further snap-fit connection directly to the second plug connector. As a result, the camera is then also fastened mechanically to the reinforcement part. In particular, the fixing of the camera to the reinforcement part is provided only by this one snap-fit connection between the two plug connectors. Alternatively or in addition, the housing of the camera is connected to the reinforcement part by way of a screw connection in the mounted final state.

The designations "above," "below," "in front," "behind," "horizontal," "vertical," "depth direction," "width direction," "height direction," etc. indicate positions and orientations during proper use and positioning of the appliance.

Further features of the invention are disclosed in the claims, the figures and the description of the figures. The features and combinations of features mentioned in the description above and the features and combinations of features set out below in the description of the figures and/or shown in the figures alone are usable not only in the respective combination given, but also in other combinations or alone without departing from the scope of the invention. Embodiments of the invention which are not explicitly shown in the figures and described, but which arise and can be created through separate combinations of features from the embodiments described, are therefore also to be considered as included and disclosed. Embodiments and combinations of features can also be regarded as disclosed which therefore do not have all the features of an originally formulated independent claim.

Although the invention is illustrated and described herein as embodied in a household appliance with a camera and a reinforcement part connected thereto as well as a method for mounting the camera, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
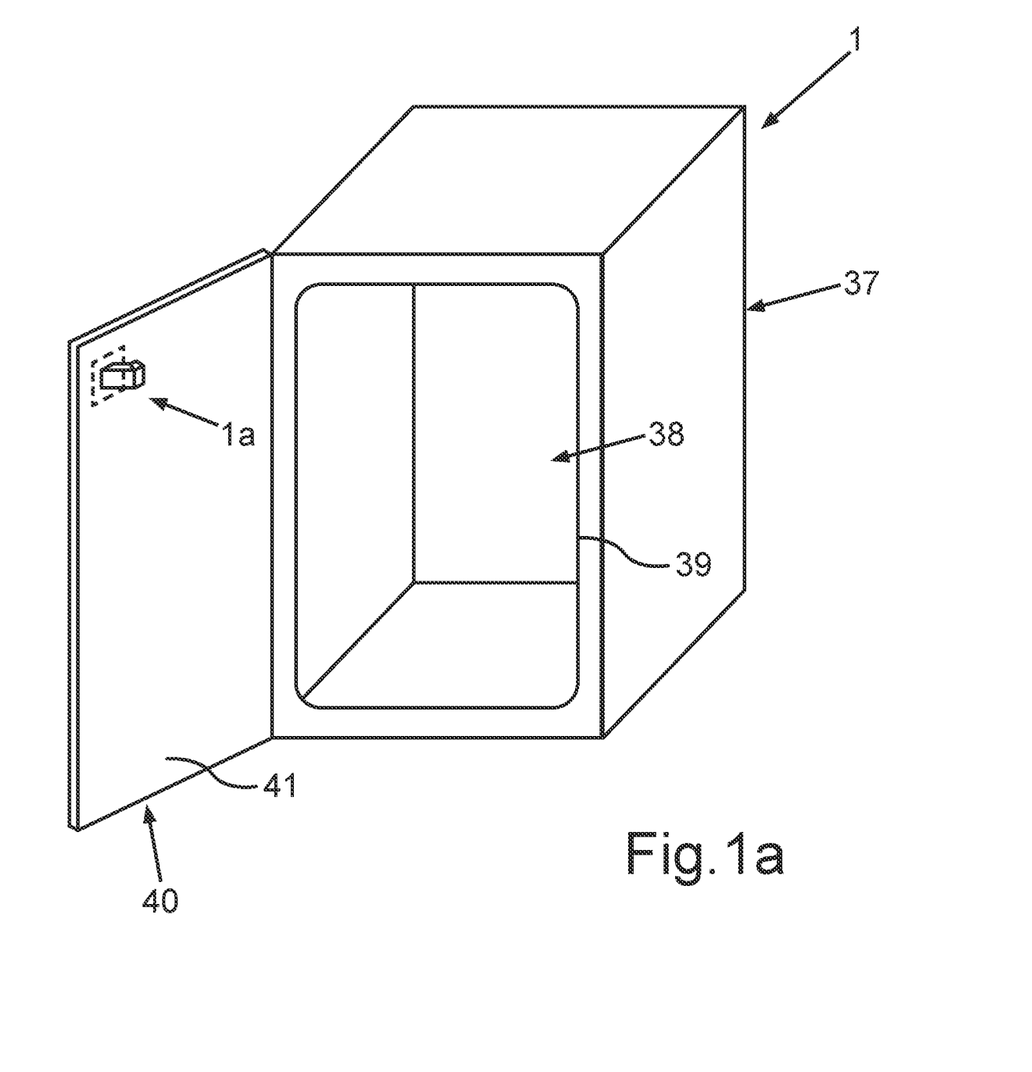
FIG. 1A is a diagrammatic, perspective view of a household appliance.

Referring now in detail to the figures of the drawings, in which the same or functionally identical elements are provided with the same reference characters, and first, particularly, to FIG. 1A thereof, there is seen a diagrammatic representation of a household appliance which in this case is a household refrigeration appliance 1. The household refrigeration appliance 1 has a housing 37. A receiving chamber 38 for receiving foodstuffs is provided in the receiving chamber 38. The receiving chamber 38 can be a refrigerator compartment or a freezer compartment. The receiving chamber 38 is delimited by walls of an inner container 39 of the household refrigeration appliance 1. The household refrigeration appliance 1 also has a door 40. The door 40 is disposed pivotably on the housing 37 for closing the receiving chamber 38. The door 40 has a wall 41, which is an inner paneling. The household refrigeration appliance 1 has a configuration 1A.

Figure 1B:
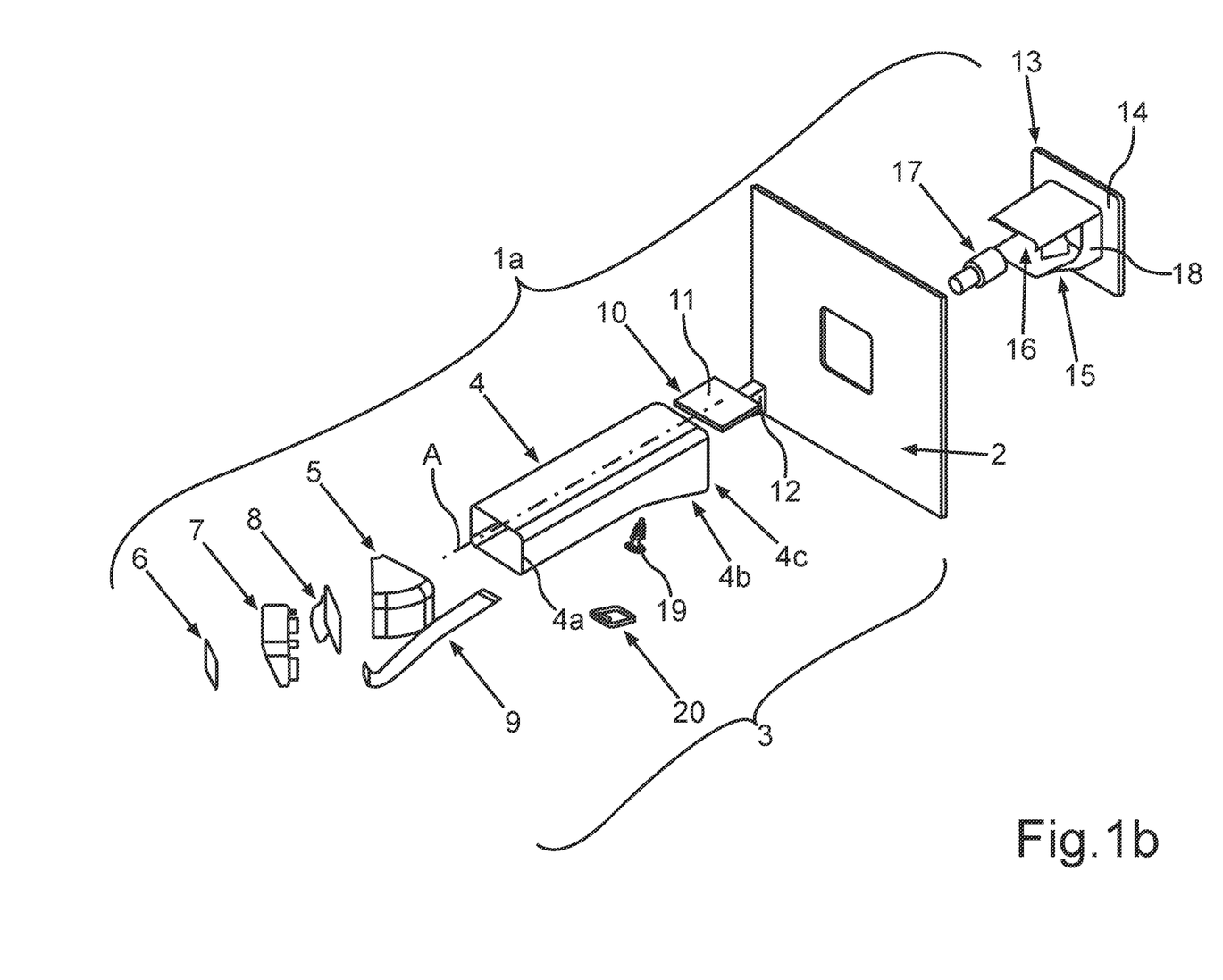
FIG. 1B is an exploded, perspective view of an exemplary embodiment of a configuration according to the invention of a camera with a reinforcement part.

FIG. 1B shows, in an exploded representation, an exemplary embodiment of a configuration 1a. The configuration 1a is constructed for mounting on a wall 2 of the household appliance, in particular of the household refrigeration appliance 1. The wall 2 can be the wall 41 or can be a wall of the inner container 39. The configuration 1a has a camera 3. The camera 3 has a housing. The housing is formed in this case in several pieces. In one exemplary embodiment, it has an elongated, straight housing slot or a housing channel 4. In the exemplary embodiment, the housing also has an arc segment 5. The arc segment 5 is constructed for joining to the housing slot 4. In particular, a snap-fit connection is provided in this case. The elongated housing slot or the housing channel 4 has a longitudinal axis A. The connection to the arc segment 5 is provided on a front end 4*a* of the housing slot 4 facing away from the wall 2. This elongated housing channel 4 is constructed to have a rectangular cross section. It can however also have a different shape. As can be seen, the housing channel 4 is embodied with a widened end piece 4*c* on a rear end 4*b* which faces toward the wall 2 in the mounted state. In this context, the widening is provided downward when viewed in the height direction. A funnel-like shape is therefore realized in the rear region of this elongated housing channel 4.

In one exemplary embodiment, the camera 3 also has an anti-fog element 6. In particular, this is a film. In one exemplary embodiment, the camera 3 also has a terminating element 7. This terminating element 7 is provided for receiving a module 8. The module 8 has a circuit board. In particular, the camera also has optical components as well as an image sensor.

Furthermore, a flexible printed circuit board 9 of the camera 3 is provided. This PCB 9 connects the module 8 to a further module 10 of the camera 3. This further module 10 has a circuit board 11. Furthermore, the module 10 also has in particular a first electrical plug connector 12.

In one exemplary embodiment, provision can be made for the housing of the camera 3 to have the two components 4 and 5. In a further exemplary embodiment, however, provision can be made for the housing of the camera 3 to have only the elongated housing channel 4. One or the other embodiment may be advantageous, depending on the positioning of the configuration 1*a* in the household refrigeration appliance. The arc or arcuate segment 5 is advantageous in particular if specific angles occur when the door of the household refrigeration appliance is opened. In particular, in this case the comprehensive recording of the receiving chamber of the household refrigeration appliance must also still be enabled.

The camera 3 can be disposed on the wall 40 of the household refrigeration appliance. It can however also be disposed on the inner container 39, which delimits the receiving chamber 38 for food. The receiving chamber 38 is to be recorded with the camera 3.

Furthermore, the configuration 1*a* has a reinforcement part 13. The reinforcement part 13 is separate from the camera 3. In one exemplary embodiment, the reinforcement part 13 is an integral component. It can be formed in particular from plastic. In one exemplary embodiment, the reinforcement part 13 has a contact plate 14. It also has a coupling unit 15. The coupling unit 15 is disposed in such a way that it protrudes from the contact plate 14. In one exemplary embodiment, the coupling unit 15 has a receiving slot 16. This receiving slot 16 is provided in particular for receiving a second electrical plug connector 17.

In one exemplary embodiment, the reinforcement part 13, in particular the coupling unit 15, has an in particular widened front piece 18. This widened front piece 18 is in particular complementary to the widened end piece 4*c* of the elongated housing slot 4, if this widening is present there.

Furthermore, a screw 19 is also already shown in FIG. 1*b* for one exemplary embodiment. The screw 19 is provided to produce a screw connection of the camera 3 to the reinforcement part 13. A cover 20 is also shown. This cover 20 is used to cover the screw 19 when the screw is screwed in.

Figure 2:
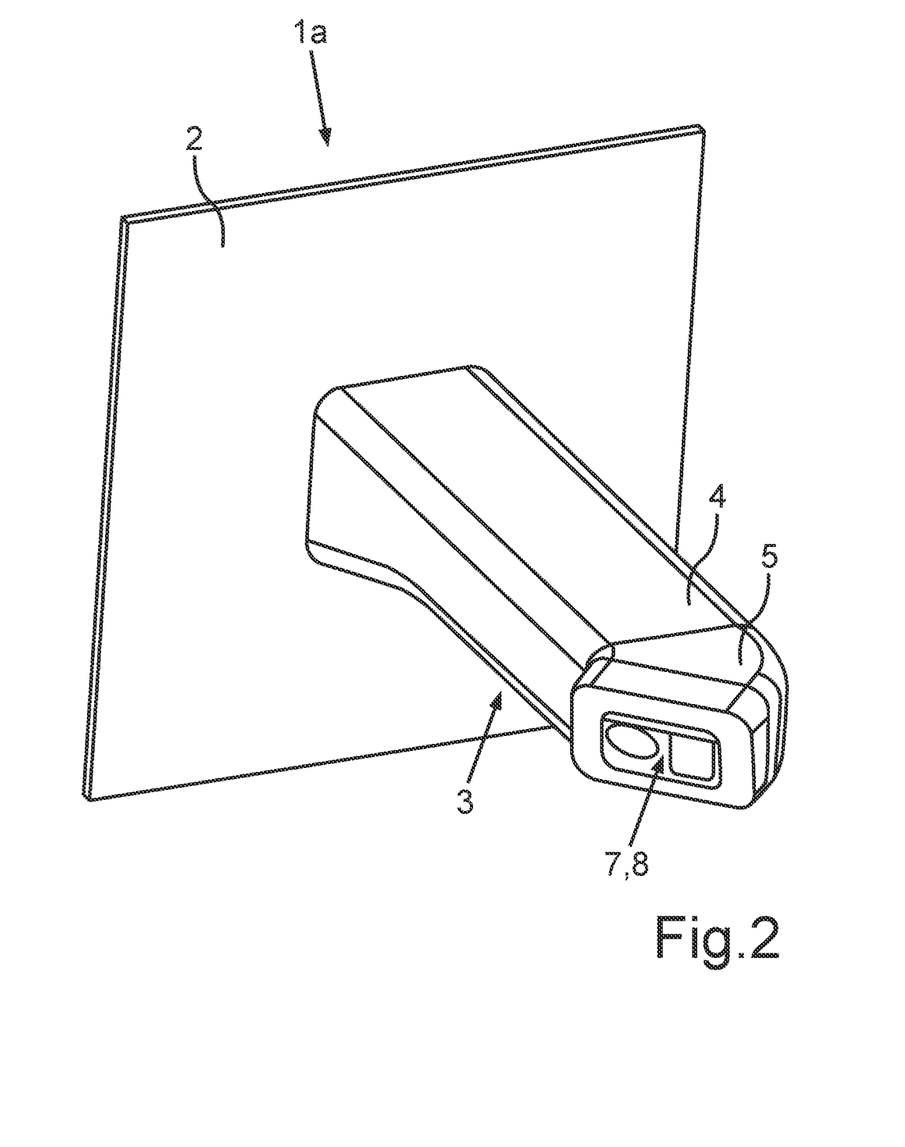
FIG. 2 is a perspective view of the configuration according to FIG. 1B in the assembled state.

FIG. 2 shows the configuration 1*a* in the assembled state.

Figure 3:
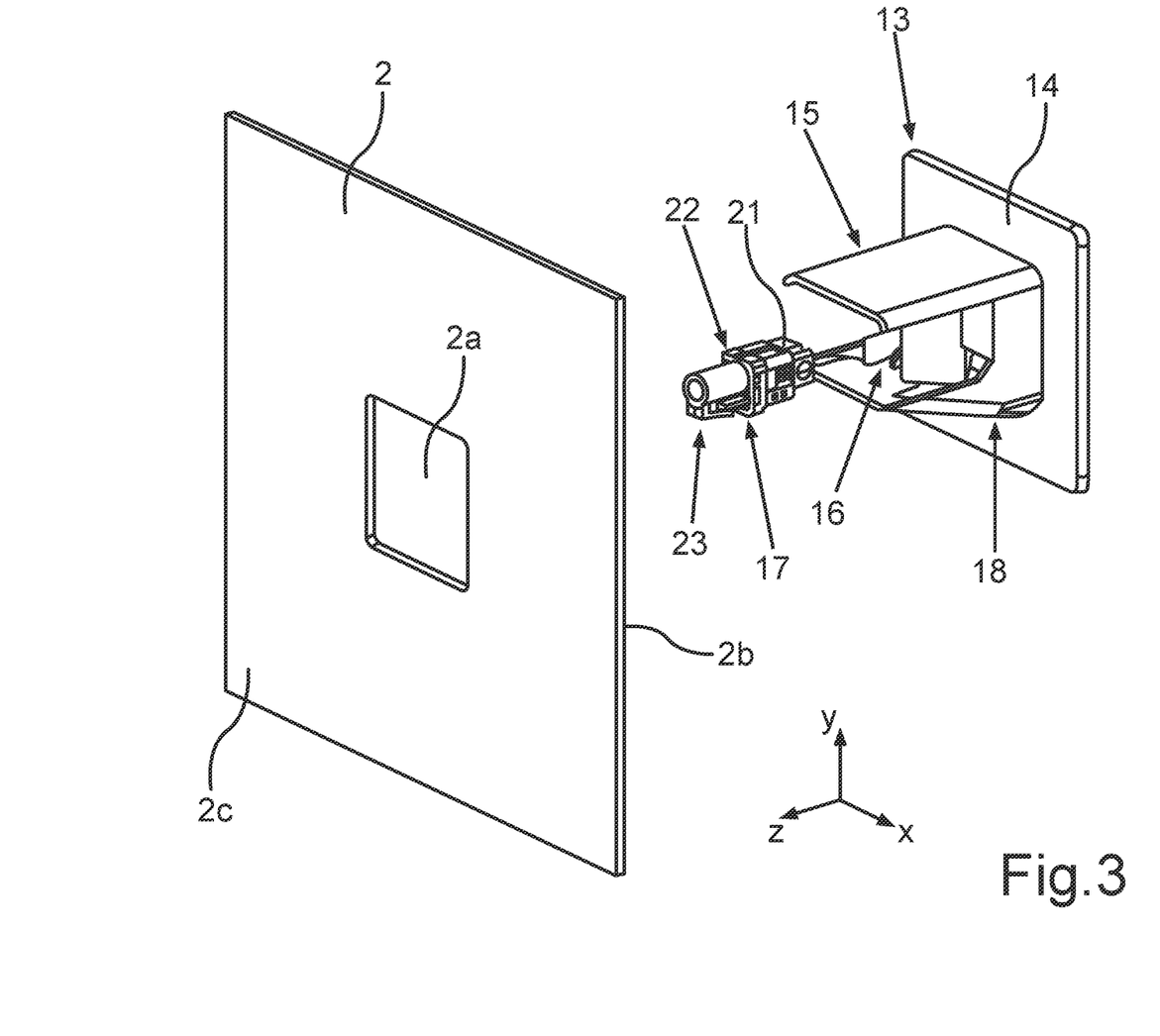
FIG. 3 is an exploded, perspective view of subcomponents of the configuration according to FIG. 1B.

FIG. 3 shows subcomponents of the configuration 1*a*. The wall 2 is shown. This wall 2 has a cutout 2*a*. In the mounted state, the reinforcement part 13 extends with the coupling unit 15 through this cutout 2*a*, as can be seen also in the assembled state according to FIG. 4. The contact plate 14, on the other hand, rests on a rear side 2*b* of the wall 2. The rear side 2*b* is also shown. As can furthermore be seen in FIG. 3, the second plug connector 17 is embodied with a first snap-fit element 21. This snap-fit element 21 is embodied in particular to be integral or one-piece with a housing 22 of the second electrical plug connector 17. In this regard, it is disposed on the side of the housing 22 in terms of orientation. In particular, it is provided that a second snap-fit element 23 is part of the second plug connector 17. This second snap-fit element 23 is embodied in particular to be integral or one-piece with the housing 22. The second snap-fit element 23 is disposed on an underside and is embodied in particular on a front region of the housing 22 to be integral therewith. The two snap-fit elements 21 and 23 are thus oriented in different spatial directions with regard to their sprung effect. In this regard, the first snap-fit element 21 is disposed in a sprung manner in a horizontal plane, in particular in the width direction (x-direction). The second snap-fit element 23 is disposed in a sprung manner in the height direction (y-direction).

Provision is made for this second plug connector 17, which can also be referred to as a socket, to be snap-fitted directly to the reinforcement part 13. In particular in this regard, a snap-fit connection 24 (FIG. 4) is provided between the snap-fit element 21 and a counter snap-fit element 25 (FIG. 5). As can also be seen in FIG. 4, in this mounted state the second electrical plug connector 17 is received in the receiving slot 16. The receiving slot 16 is delimited in the upward direction by a slot wall 26 and in the downward direction by a slot wall 27. Furthermore, lateral slot walls 28 and 29 (FIG. 5) are also formed.

Figure 4:
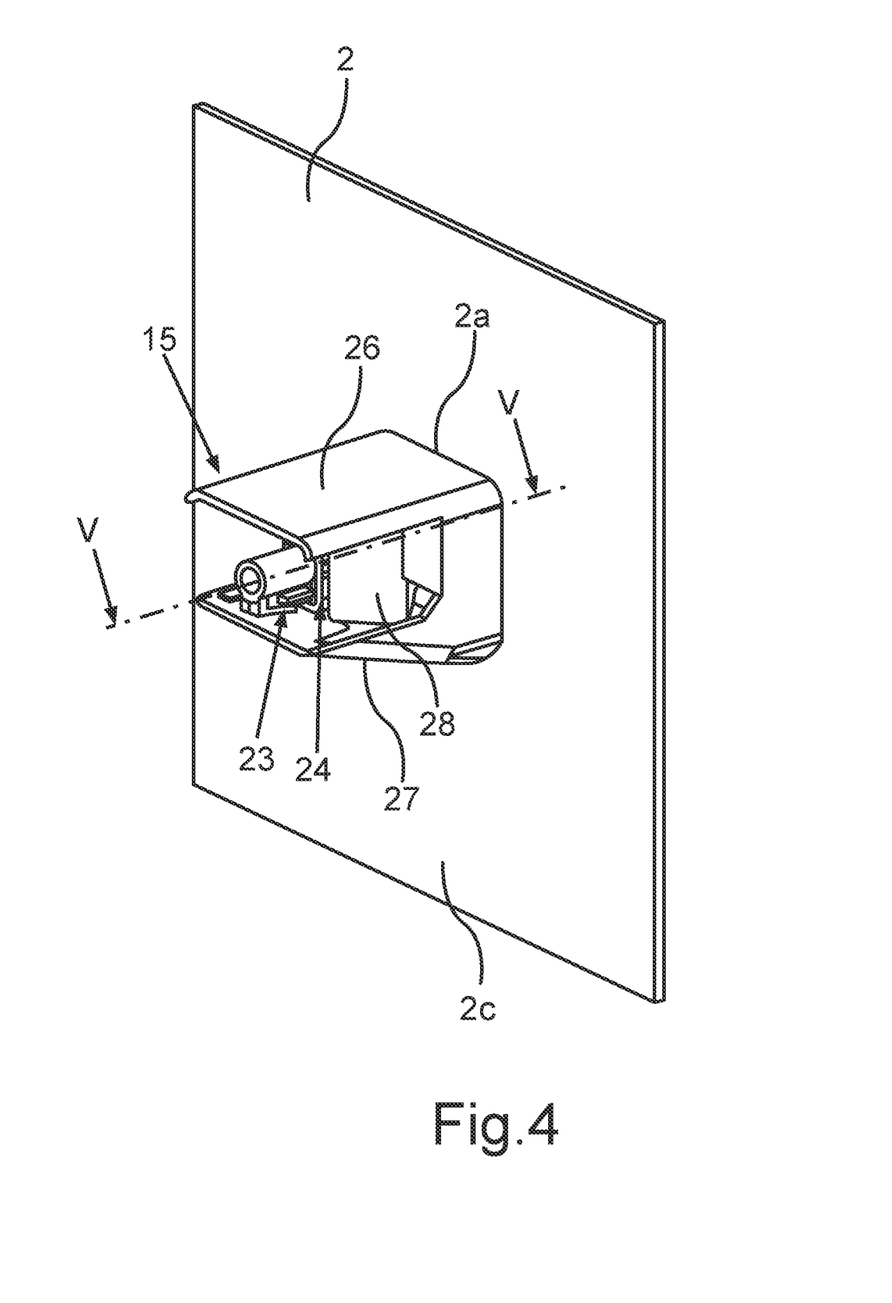
FIG. 4 is a perspective view of the components according to FIG. 3 in the assembled state.
Figure 5:
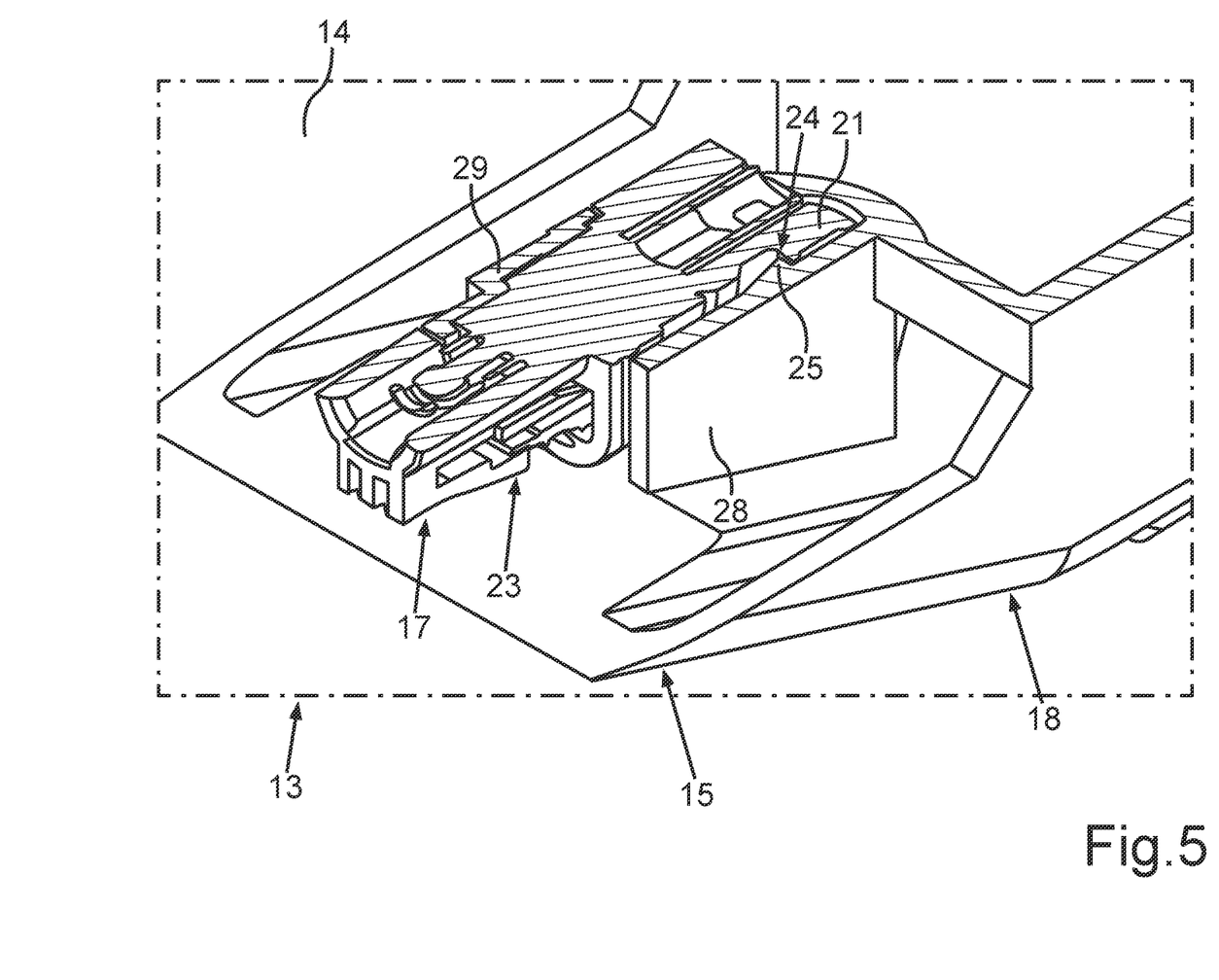
FIG. 5 is a fragmentary, perspective, sectional view of the configuration shown in FIG. 4.

As shown in FIG. 5, which shows a perspective sectional view along the section line V-V in FIG. 4, the snap-fit element 21 is snap-fitted to the counter snap-fit element 25. The snap-fit connection 24 is thus formed.

In the mounting method of the configuration 1*a*, this submodule is mounted separately as shown in FIG. 3 to FIG. 5. The camera 3 is mounted independently thereof. In this case, the first electrical plug connector 12 is also installed with the circuit board 11 inside the elongated housing channel 4. Once the camera 3 has been assembled in this regard, then in a further mounting step the mounting of the camera 3 on the reinforcement part 13 can take place. To this end, the camera 3 is introduced from a front side 2*c* (FIG. 3) of the wall. As can be seen in FIG. 4, the coupling unit 15 extends through the cutout 2*a* and is thus also present on the front side 2*c* of the wall 2. The contact plate 14 rests in particular over its entire surface directly on the rear side 2*b* of the wall 2.

Figure 6:
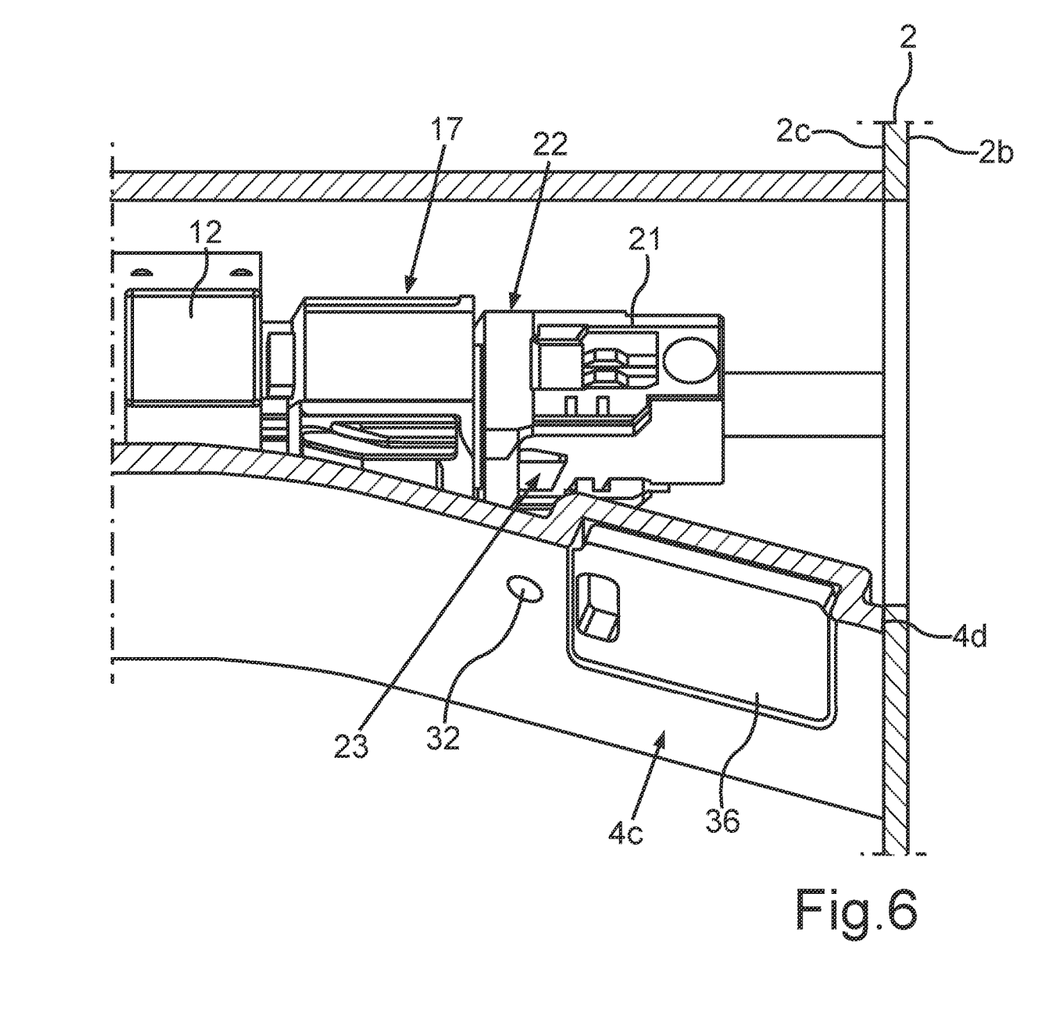
FIG. 6 is a fragmentary, perspective, sectional view of subcomponents of the configuration according to FIG. 1B in the assembled state.

FIG. 6 shows a perspective sectional representation of the mounted state of the configuration 1*a*. Subcomponents are shown therein. In particular, for the sake of clarity, the coupling unit 15 of the reinforcement part 13 is not shown therein. The already coupled and thus plugged-together first electrical plug connector 12 and second electrical plug connector 17 are shown therein.

In this exemplary embodiment, no provision is made for a snap-fitting connection between the first electrical plug connector 12 and the second electrical plug connector 17. For this reason, the second snap-fit element 23 of the second electrical plug connector 17 is not snap-fitted to the first electrical plug connector 12 with a counter snap-fit element of the first electrical plug connector 12. In this case, the two electrical plug connectors 12 and 17 are only inserted into one another. It can also be seen that the elongated housing channel 4 rests with a rear edge 4d directly on the front side 2c of the wall 2.

In the exemplary embodiment shown therein, a screw connection 30 (FIG. 8) is provided to fasten the camera 3 to the reinforcement part 13. This screw connection 30 includes the single screw 19, which is screwed in from below in a screw boss 31 in the coupling unit 15. In this context, the widened end piece 4c has a hole through which the screw 19 is guided. Provision can be made in an exemplary embodiment for the screw 19, once fully screwed in, to be covered with a cover 36.

Provision is made in an exemplary embodiment for the housing of the camera 3, in particular the elongated housing channel 4, to have a release opening 32 (FIG. 6). This release opening 32 is a through-hole. It is formed in the region of the second snap-fit element 23.

In this way, in a further exemplary embodiment in which no screw connection 30 and thus no screw 19 is present but instead in which the two electrical plug connectors 12 and 17 are connected directly by way of a further snap-fit connection, it is possible to engage through the release opening 32 with a tool and release this snap-fit connection between the plug connectors 12 and 17.

Figure 7:
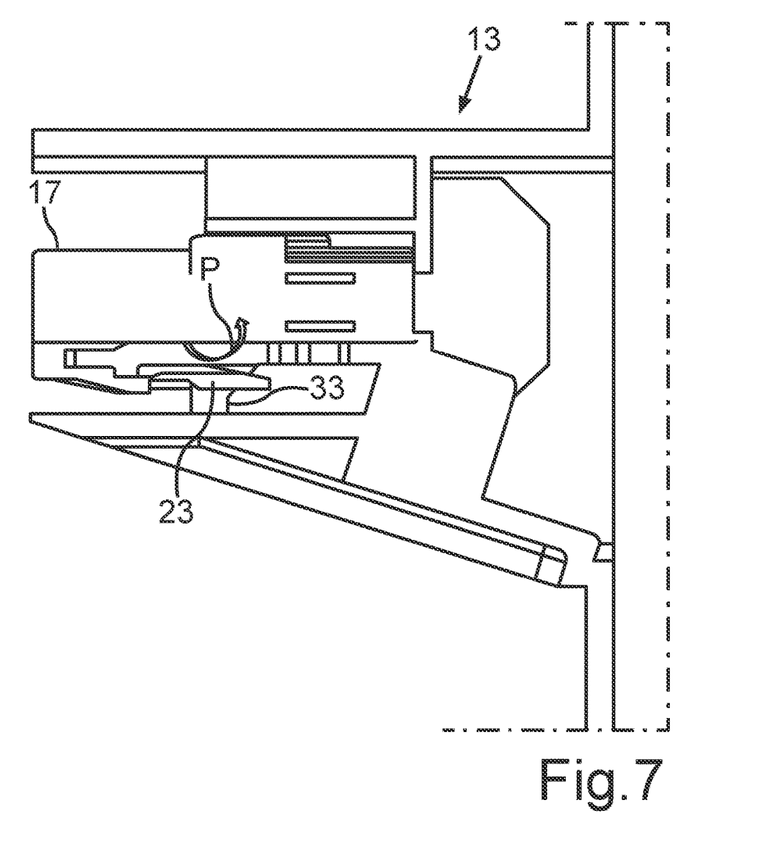
FIG. 7 is a diagrammatic, sectional view of subcomponents of an exemplary embodiment of a configuration according to the invention.
Figure 8:
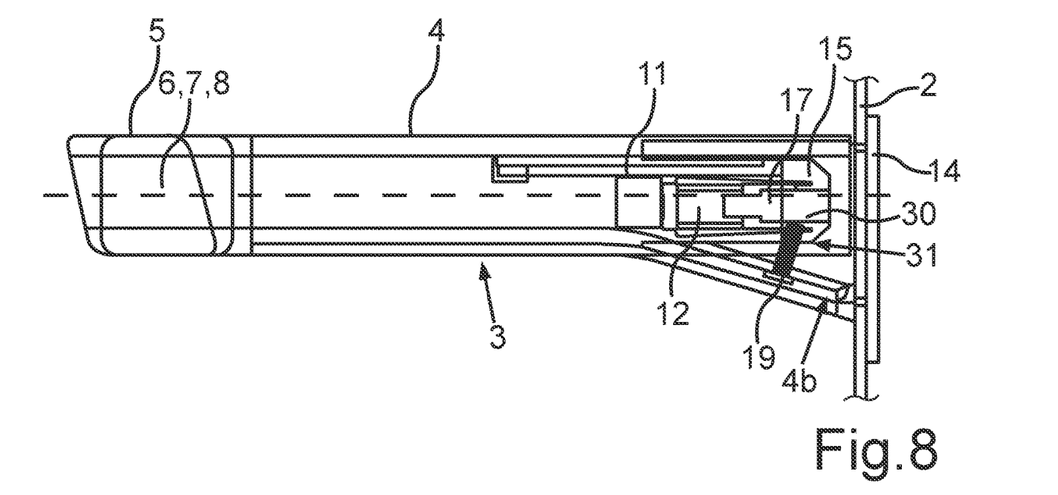
FIG. 8 is a diagrammatic, sectional view through an assembled configuration according to the invention with the components according to FIG. 7.

FIG. 7 shows a diagrammatic side view of the exemplary embodiment according to FIGS. 6 and 8 with the screw connection to subcomponents. In this case, a guide ramp 33 is indicated diagrammatically on the reinforcement part 13. During the mounting of the second electrical plug connector 17 on the reinforcement part 13, when the second electrical plug connector 17 is guided in a linear manner into this receiving slot 16, this second snap-fit element 23 is pressed upward by this guide ramp 33 as indicated by an arrow P. This position is retained in the mounted final state of the second electrical plug connector 17. This position is such that a counter snap-fit element 34 present on the first electrical plug connector 12 (FIG. 9) cannot snap-fit to this snap-fit element 23. In this exemplary embodiment, no direct snap-fitting between the two electrical plug connectors 12 and 17 is therefore provided in the mounted final state. Instead, provision is then made only for the single screw connection 30 in this case. The housing of the second plug connector 17 can be used as an identical part in configuration variants which either have this screw connection 30 or instead have a snap-fit connection 35.

For an exemplary embodiment in which the single screw connection 30 is provided to connect the camera 3 and the reinforcement part 13 in a retaining manner, the second plug connector 17 can also be provided without the snap-fit element 23 and the guide ramp 33 can be dispensed with.

Figure 9:
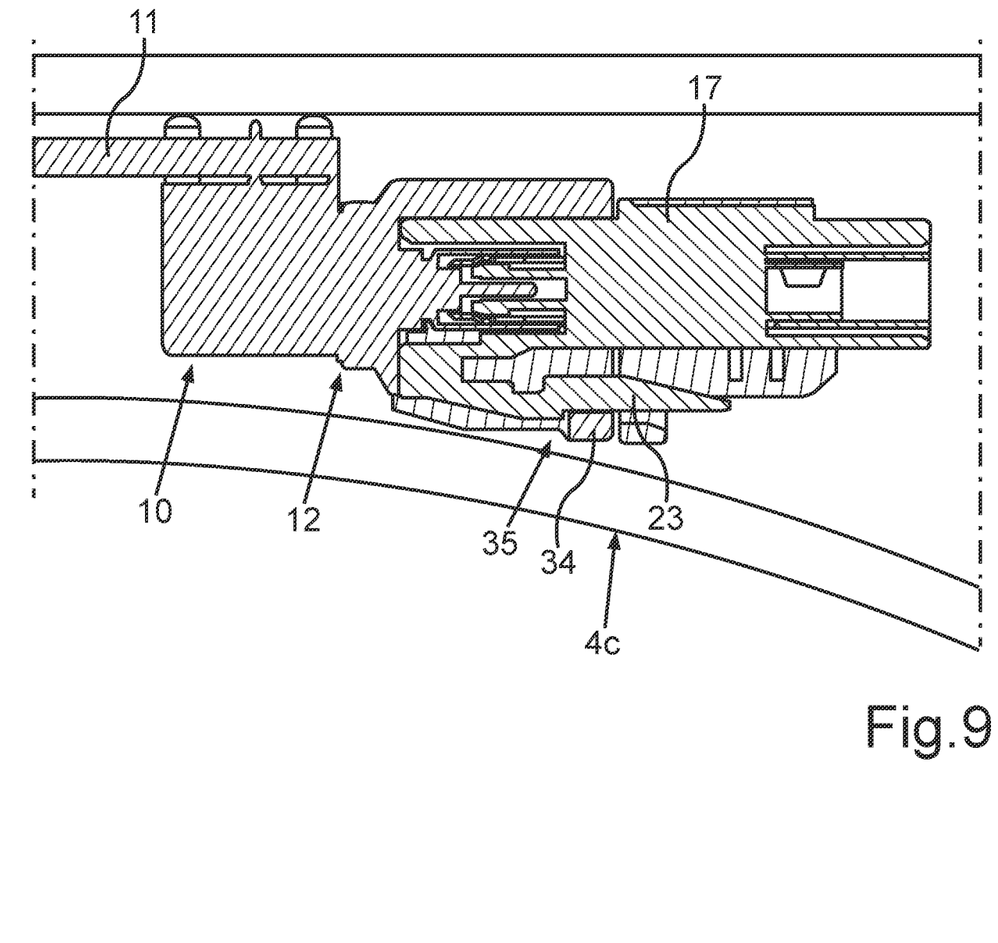
FIG. 9 is a sectional view through a subregion of a further exemplary embodiment of a configuration according to the invention.

In a further exemplary embodiment, as shown in the sectional representation in FIG. 9, the mechanical connection between the plug connectors 12 and 17 is implemented by way of a snap-fit connection 35. The snap-fitted state between the snap-fit element 23 and the counter snap-fit element 34 is shown therein.

In this exemplary embodiment, no screw connection 30 is present. The mechanical connection between the camera 3 and the reinforcement part 13 is implemented in this case only by way of the retaining snap-fit connection 35.

During mounting, the fully mounted camera 3, as already described above, is guided toward the wall 2 in a linear manner in the direction of the already pre-mounted reinforcement part 13. In this case, the components, namely the elongated housing channel 4 and the coupling unit 15, are guided into one another. A guidance is also achieved in this regard by way of the widened pieces 18 and 4c which are preferably present. A blind joining is thus implemented. With this blind joining, a mechanical and electrical connection of the electrical plug connectors 12 and 17 is automatically achieved. No additional mounting effort is then subsequently required with regard to the plug connectors 12 and 17.

The following is a summary list of reference numerals and the corresponding structure used in the above description of the invention:

1 Household refrigeration appliance
1a Configuration
2 Wall
2a Cutout
2b Rear side
2c Front side
3 Camera
4 Housing slot
4a Front end
4b Rear end
4c End piece
4d Rear edge
5 Arc segment
6 Anti-fog element
7 Terminating element
8 Module
9 Printed circuit board
10 Module
11 Circuit board
12 Plug connector
13 Reinforcement part
14 Contact plate
15 Coupling unit
16 Receiving slot
17 Plug connector
18 Front piece
19 Screw
20 Cover
21 Snap-fit element
22 Housing
23 Snap-fit element
24 Snap-fit connection
25 Counter snap-fit element
26 Slot wall
27 Slot wall
28 Slot wall
29 Slot wall
30 Screw connection
31 Screw boss
32 Release opening
33 Guide ramp
34 Counter snap-fit element
35 Snap-fit connection
36 Cover
37 Housing
38 Receiving space
39 Inner container
40 Door
41 Wall
x Width direction
y Height direction
A Longitudinal axis

The invention claimed is:

1. A household appliance, comprising:
    a wall of the household appliance, said wall of the household appliance having opposite sides and a cutout;
    a camera having a housing and a first electrical plug connector disposed in said housing of said camera;
    a reinforcement part separate from said camera, said reinforcement part configured for direct connection to said housing of said camera through said cutout with said housing of said camera and said reinforcement part each disposed on a respective one of said opposite sides of said wall of the household appliance, said reinforcement part having a second electrical plug connector being a separate component configured for connection to said first electrical plug connector; and
    said reinforcement part having at least one of:
        a snap-fit connection of said second plug connector on said reinforcement part, or
        a snap-fit connection of said second plug connector to said first electrical plug connector in a mounted state, or
        a screw connection of said reinforcement part to said housing of said camera to in a mounted final state.

2. The household appliance according to claim 1, wherein:
    said reinforcement part has a contact plate for contact on said wall of the household appliance;
    said reinforcement part has a coupling unit protruding from said contact plate; and
    said coupling unit has a receiving slot in which said second plug connector is disposed and snap-fitted to said coupling unit by said snap-fit connection of said second plug connector on said reinforcement part.

3. The household appliance according to claim 2, wherein:
    said second plug connector has a housing;
    said receiving slot has a slot wall with an inner side;
    said snap-fit connection of said second plug connector on said reinforcement part has a snap-fit element integrated on said housing of said second plug connector; and
    said snap-fit connection of said second plug connector on said reinforcement part has a counter snap-fit element disposed on said inner side of said slot wall of said receiving slot.

4. The household appliance according to claim 1, wherein:
    said reinforcement part has a guide ramp;
    said second plug connector has a housing with a snap-fit element for snap-fitting to said first plug connector;
    said guide ramp pushes said snap-fit element out of a snap-fit position to prevent said snap-fit element of said second plug connector from being snap-fitted to said first plug connector in the mounted state.

5. The household appliance according to claim 1, wherein said reinforcement part has a widened front piece, said housing of said camera has a widened end piece into which said widened front piece of said reinforcement part is inserted, and said screw connection is provided in said widened end piece of said housing of said camera and in said inserted widened end piece of said reinforcement part.

6. The household appliance according to claim 5, wherein said camera and said reinforcement part form a configuration having a longitudinal axis, said second plug connector has a rear end, and said screw connection is disposed behind said rear end of said second plug connector in a direction of said longitudinal axis of said configuration.

7. The household appliance according to claim 1, which further comprises:
    a counter snap-fit element disposed on said first plug connector;
    said second plug connector having a housing with a snap-fit element for snap-fitting to said counter snap-fit element; and
    said snap-fit element and said counter snap-fit element forming said snap-fit connection of said second plug connector to said first electrical plug connector in the mounted state.

8. The household appliance according to claim 7, wherein no additional screw connection is provided to retain said housing of said camera on said reinforcement part.

9. The household appliance according to claim 7, wherein said housing of said camera has a release opening for receiving a tool from outside said housing of said camera for engaging and releasing said snap-fit connection of said second plug connector to said first electrical plug connector.

10. The household appliance according to claim 1, wherein:
    said reinforcement part has a widened front piece;
    said housing of said camera has a widened end piece into which said widened front piece of said reinforcement part is inserted; and
    said widened end piece of said housing of said camera and said widened front piece of said reinforcement part form guides through which said first and second plug connectors are automatically joined together upon fitting said housing of said camera onto said reinforcement part.

11. The household appliance according to claim 1, wherein:
    said reinforcement part has a coupling unit extending through said cutout in said wall of the household appliance for coupling said reinforcement part disposed on one side with said camera disposed on an opposite side of said wall of the household appliance in the mounted state; and
    said housing of said camera has a rear edge resting on said wall of the household appliance in the mounted state.

12. The household appliance according to claim 1, wherein said housing of said camera has an end facing away from said reinforcement part and an elongated housing slot disposed at said end facing away from said reinforcement part.

13. The household appliance according to claim 12, wherein said elongated housing slot is an arc segment.

14. The household appliance according to claim 1, wherein the household appliance is a household refrigeration appliance.

15. A method for mounting a camera on a wall of a household appliance, the method comprising:
    providing a wall of the household refrigeration appliance;
    providing a camera with a housing and a first electrical plug connector disposed in the housing of the camera;
    providing a reinforcement part separate from the camera, the reinforcement part configured for direct connection to the housing of the camera through a cutout in the wall of the household refrigeration appliance;
    positioning the housing of the camera and the reinforcement part on opposite sides of the wall of the household refrigeration appliance;

providing the reinforcement part with a second electrical plug connector being a separate component configured for connection to the first electrical plug connector; and at least one of:
- using a snap-fit connection to snap-fit the second plug connector on the reinforcement part, or
- using a snap-fit connection to snap-fit the first electrical plug connector to the second electrical plug connector, or
- using a screw connection to connect the housing of the camera to the reinforcement part in a mounted final state.

* * * * *